United States Patent Office 3,729,489
Patented Apr. 24, 1973

---

3,729,489
2-OXACHOLESTEROL AND INTERMEDIATES
Robert J. Chorvai, Arlington Heights, Raphael Pappo,
Skokie, and Mike G. Scaros, Arlington Heights, Ill.,
assignors to G. D. Searle & Co., Chicago, Ill.
No Drawing. Continuation-in-part of application Ser. No.
821,948, May 5, 1969, now Patent No. 3,644,342.
This application Dec. 17, 1971, Ser. No. 209,384
Int. Cl. C07d 7/04, 7/20
U.S. Cl. 260—343.2 S        7 Claims

ABSTRACT OF THE DISCLOSURE

Cholest-4-en-3-one is allowed to react with ethyl formate to produce the intermediate 2-hydroxymethylenecholest-4-en-3-one, which upon ozonolysis, yields 2-hydroxycholesta-1,4-dien-3-one. Oxidation of that compound affords 1-oxo-1,2-seco-A-norcholest-4-en-3-oic acid which then is reduced to 2-oxocholest-4-en-3-one. The latter compound is isomerized to produce 2-oxacholest-5-en-3-one which is converted to the instant 2-oxacholest-5-en-3-ol. The compounds of this invention are useful as intermediates and as pharmacological agents as is evidenced by their central nervous system-affective, antiulcerogenic and hypocholesterolemic activity.

---

This application is a continuation-in-part of our co-pending application Ser. No. 821,948 filed May 5, 1969, now U.S. Pat. 3,644,342.

The present invention is concerned with steroids of the cholestane family. More particularly, it is concerned with 2-oxacholestanes of the following structural formula

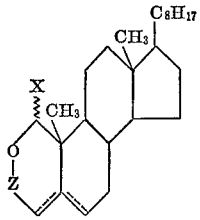

wherein Z is a carbonyl or hydroxymethylene radical, X is a hydrogen or hydroxy radical and the dotted line indicates either a $\Delta^4$ or $\Delta^5$ double bond.

A preferred method of manufacturing the instant compounds of this invention begins with the reaction of cholest-4-en-3-one with ethyl formate, thus affording the 2-hydroxymethylenecholest-4-en-3-one derivative. Ozonolysis of that derivative then yields 2-hydroxycholesta-1,4-dien-3-one, which, upon oxidation, yields 1-oxo-1,2-seco-A-norcholest-4-en-3-oic acid, which is reduced with sodium borohydride and cyclized to 2-oxacholest-4-en-3-one. That compound is isomerized by refluxing in base to produce 2-oxacholest-5-en-3-one. Reduction of the latter compound with diisobutyl aluminum hydride then produces the instant 2-oxacholest-5-en-3-ol.

The compounds of this invention exhibit central nervous system-affective, hypocholesterolemic and antiulcerogenic activity, and thus they are valuable as pharmacological agents. For example, 1-oxo-1,2-seco-A-norcholest-4-en-3-oic acid displays anti-ulcerogenic activity when tested in an assay designed to determine that activity, which is described in U.S. Pat. 3,483,192. The hypocholesterolemic activity of 2-oxacholest-5-en-3-one is shown in an assay described in U.S. Pat. 3,501,506. The central nervous system-affective activity of 2-oxacholest-5-en-3-ol is demonstrated when that compound is tested in the following assay based on that described by N. W. Dunham and P. S. Miya in J. Amer. Pharm. Assoc. (Sci. Ed.), 46, 208 (1957):

To each of ten male or female mice, weighing 20–30 g., is administered, intragastrically, a dose of the compound to be tested. At a specific time after the administration of the test compound (2.5 hours), each mouse is placed on a rotating rod upon which untreated mice can remain indefinitely. A dose of compound is rated active if $\geqq 20\%$ of the mice are unable to remain on the rod for 1 minute.

The invention will appear more fully from the examples which follow. These examples are not to be construed as limiting either in spirit or in scope as many modifications both in materials and methods will be apparent to one skilled in the art. In the following examples temperatures are given in degrees centigrade (° C.) and quantities of material are expressed in parts by weight unless parts by volume is noted.

EXAMPLE 1

To a solution of 38.4 parts of cholest-4-en-3-one and 46 parts of ethyl formate in 528 parts of benzene is added portionwise 6 parts of sodium hydride. Approximately 0.2 part of methanol is then added and the reaction mixture is stirred at room temperature for about 16 hours. At the end of that time the excess reagent is destroyed by the addition of a small quantity of methanol and that solution is made acidic by the addition of dilute hydrochloric acid. The resulting two-phase system is stirred vigorously in order to effect hydrolysis of the precipitated sodium salt, then is separated. The aqueous layer is extracted with ether and the extracts are combined with the benzene layer. The resulting solution is washed with water, dried over anhydrous sodium sulfate and stripped of solvent by distillation under reduced pressure. The resulting oily residue is recrystallized from ethyl acetate, thus affording 2 - hydroxymethylenecholest-4-en-3-one, melting at about 100–105°. Further purification is effected by an additional recrystallization from ethyl acetate.

EXAMPLE 2

A stream of ozone is passed through a solution containing 50 parts of 2-hydroxymethylenecholest-4-en-3-one, 536 parts of methylene chloride, 800 parts of pyridine and 112 parts of dimethyl sulfide at −65° until somewhat more than one equivalent has been absorbed. That mixture is allowed to warm to room temperature and the solvent is removed by distillation under reduced pressure. The resulting oily residue is dissolved in benzene, then is washed successively with dilute hydrochloric acid, dilute aqueous sodium bicarbonate and water, dried over anhydrous sodium sulfate and stripped of solvent under reduced pressure. That oily residue is taken up in ethanol, thus affording 2-hydroxycholesta-1,4-dien-3-one upon cooling. Further purification by recrystallization from ethanol gives the pure substance, melting at about 106.5–107.5°. This compound exhibits an ultraviolet absorption maximum at about 255 millimicrons with a molecular extinction coefficient of about 14,800, infrared absorption peaks, in chloroform, at about 2.90 and 6.10 microns and nuclear magnetic resonance peaks at about 44, 49, 55, 75, 371 and 379 hertz.

EXAMPLE 3

A mixture containing 50 parts of 2-hydroxycholesta-1,4-dien-3-one, 7.80 parts of 1,4-diazabicyclo[2,2,2]octane, 4.66 parts of 2,2′-bipyridine and 5.96 parts of cupric acetate monohydrate in 750 parts of dimethylformamide is shaken under an oxygen atmosphere at about 15–40 pounds per square inch at 35–40° for 48–

96 hours. After that time, water and ether are added to form two phases which are separated. The aqueous layer is extracted with ether and the ethereal extracts are washed with aqueous 1 N hydrochloric acid and saturated sodium chloride solution. After drying over anhydrous sodium sulfate, the solvent is removed by evaporation under reduced pressure. The material which remains then is dissolved in n-hexane. Upon cooling and standing for about 16 hours, pure 1-oxo-1,2-seco-A-norcholest-4-en-3-oic acid is obtained as crystals, melting at about 141–142°. This compound exhibits an ultraviolet absorption maximum at about 227 millimicrons, infrared absorption maxima at about 5.78 and 5.88 microns and nuclear magnetic resonance peaks at about 42, 48, 55, 72, 328 and 342 hertz. That compound is represented by the following structural formula

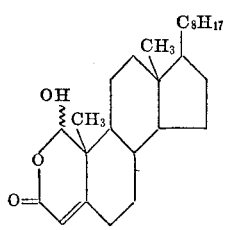

EXAMPLE 4

1.4 parts of 1-oxo-1,2-seco-A-norcholest-4-en-3-oic acid is dissolved in 47.6 parts of methanol and to that solution is added, successively, 2 parts by volume of aqueous 5% sodium hydroxide solution, 20 parts of water and 0.7 part of sodium borohydride. Then a layer of benzene is added to cover the reaction mixture which is stirred for 3 hours at room temperature. After that time, additional portions of benzene and water are added and the two phases which form are separated. The aqueous phase is extracted with ether and the ethereal extracts are combined with the benzene layer. Then the combined extracts are washed with water, dried over anhydrous sodium sulfate and evaporated to dryness. The solid which remains is recrystallized from n-hexane-ether to yield pure 2-oxacholest-4-en-3-one, melting at about 127.5–128°. That compound displays infrared absorption maxima at about 5.80 and 6.13 microns and nuclear magnetic resonance peaks at about 42, 48, 54, 72, 232–260 and 339 hertz. It is structurally represented by the following formula

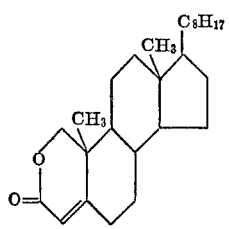

EXAMPLE 5

To a solution containing 3.5 parts of 2-oxacholest-4-en-3-one in 81.6 parts of denatured ethanol is added 70 parts by volume of a 5% aqueous sodium hydroxide solution and the reaction mixture is refluxed for 1 hour. After that time, the reaction mixture is cooled and acidified with 1 N hydrochloric acid solution to afford a white precipitate. Separation of that product and recrystallization from denatured ethanol gives pure 2-oxacholest-5-en-3-one, melting at about 106.5–108° and exhibiting nuclear magnetic resonance peaks at about 43, 49, 55, 68, 198, 229, 241, 249, 261 and 327 hertz. That compound is further characterized by an infrared absorption peak at about 1740 reciprocal centimeters and the following structural formula

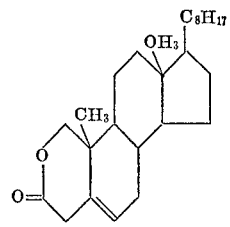

EXAMPLE 6

To a solution consisting of 3.5 parts of 2-oxacholest-5-en-3-one dissolved in 260.1 parts of dry toluene, under a nitrogen atmosphere and cooled to −65°, is added, in one portion, 9 parts of a solution consisting of 20% diisobutyl aluminum hydride in toluene. After that addition, the reaction mixture is stirred at −65° for about 30 minutes and then a few parts of acetone is added to destroy the excess reducing agent. The reaction mixture is shaken with 250 parts by volume of a 10% aqueous solution of ethylenediaminetetraacetic acid tetrasodium salt and the two layers which form are separated. After extracting the aqueous layer with an additional portion of ether, the combined organic extracts are washed with saturated sodium chloride solution, dried over anhydrous sodium sulfate and upon solvent removal under reduced pressure an oil remains. That oil is dissolved in denatured ethanol and upon addition of water a crude solid product forms. Recrystallization of the crude product from ethanol-water produces pure 2-oxacholest-5-en-3-ol, melting at about 92–95° with decomposition, as an epimeric mixture in a ratio of 3β:3α of about 9:1. That mixture is characterized by an infrared absorption peak at about 3600 reciprocal centimeters and by nuclear magnetic resonance maxima at about 42, 52, 57, 76, 189, 201, 236, 248, 299 and 327 hertz. It is further characterized by the following structural formula

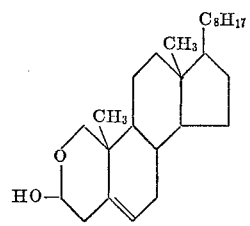

What is claimed is:
1. A compound of the formula

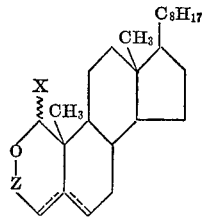

wherein Z is a carbonyl or hydroxymethylene radical, X is a hydrogen or hydroxyl radical and the dotted line indicates either a Δ⁴ or Δ⁵ double bond with the provision that when the Δ⁴ double bond is present, Z is carbonyl and when the Δ⁵ double bond is present, X is hydrogen.

2. As in claim 1, a compound of the formula

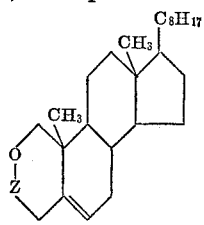

wherein Z is selected from the group consisting of carbonyl and hydroxymethylene radicals.

3. As in claim 1, a compound of the formula

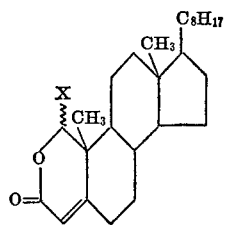

wherein X is selected from the group consisting of hydrogen and hydroxy radicals.

4. As in claim 1, the compound which is 1-hydroxy-2-oxacholest-4-en-3-one.

5. As in claim 1, the compound which is 2-oxacholest-4-en-3-one.

6. As in claim 1, the compound which is 2-oxacholest-5-en-3-one.

7. As in claim 1, the compound which is 2-oxacholest-5-en-3-ol.

References Cited

UNITED STATES PATENTS 3,101,350   8/1963   Pappo _____ 260—345.2

JOHN M. FORD, Primary Examiner

U.S. Cl. X.R.

260—345.2; 424—279, 283